Figure 4:
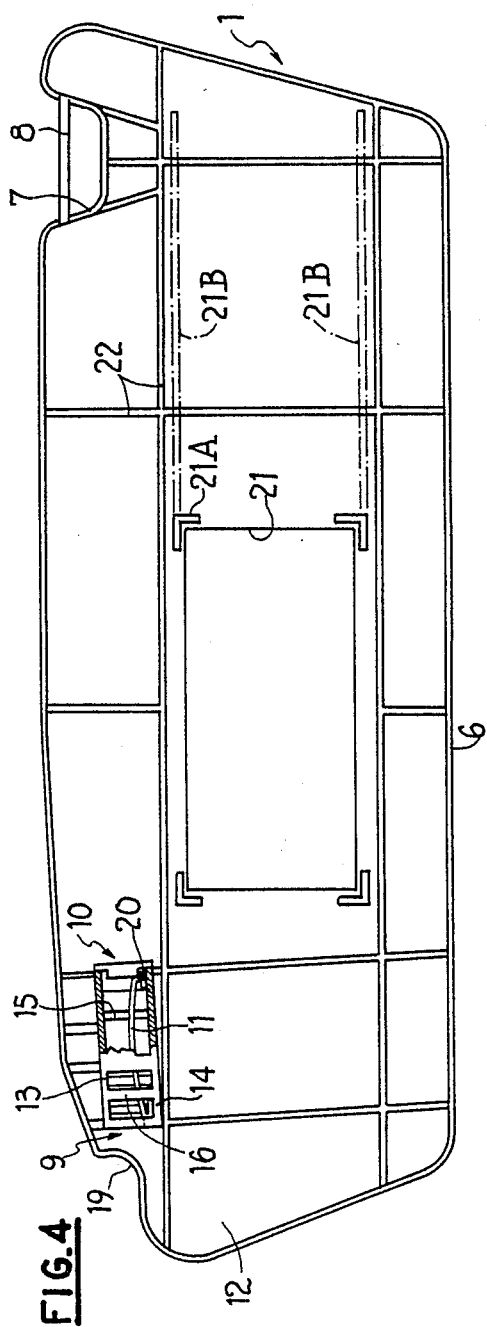

United States Patent [19]

Canadas et al.

[11] Patent Number: 4,518,192

[45] Date of Patent: May 21, 1985

[54] SUN-GLARE SHIELD IN PARTICULAR FOR AN AUTOMOBILE VEHICLE

[75] Inventors: Jean C. Canadas, Remiremont; Gilles Vigo, Rupt sur Moselle, both of France

[73] Assignee: Compagnie Industrielle de Mecanismes en abrege C.I.M., France

[21] Appl. No.: 409,738

[22] Filed: Aug. 19, 1982

[30] Foreign Application Priority Data

Sep. 28, 1981 [FR] France .................. 81 18233

[51] Int. Cl.³ .................................. B60J 3/00
[52] U.S. Cl. .......................... 296/97 H; 296/97 K; 350/631
[58] Field of Search ............. 296/97 H, 97 K, 97 R, 296/97 G, 97 J; 160/DIG. 3; 362/135, 142, 144; 350/288, 307

[56] References Cited

U.S. PATENT DOCUMENTS

| 1,957,847 | 5/1934 | Peters | 296/97 G |
| 3,375,364 | 3/1968 | Marcus | 362/144 |
| 3,383,132 | 5/1968 | Stamp | 297/97 C |
| 3,827,748 | 8/1974 | Herr et al. | 296/97 H |

FOREIGN PATENT DOCUMENTS

| 0053663 | 6/1982 | European Pat. Off. | 296/97 H |
| 2231309 | 1/1974 | Fed. Rep. of Germany | 296/97 H |
| 2429685 | 2/1980 | France | 296/97 H |
| 2034397 | 6/1980 | United Kingdom | 296/97 K |

Primary Examiner—Robert B. Reeves
Assistant Examiner—Dennis H. Pedder

[57] ABSTRACT

A sun-glare shield comprised of first and second semi-shells formed of plastic material and assembled together, with the first semi-shell being provided with a window behind which a mirror may be either secured against a boss or retractably supported by longitudinal slideways. The exterior surfaces of the first and second semi-shells are covered by respective front and rear sheets forming an outer decorative covering for the shield.

2 Claims, 5 Drawing Figures

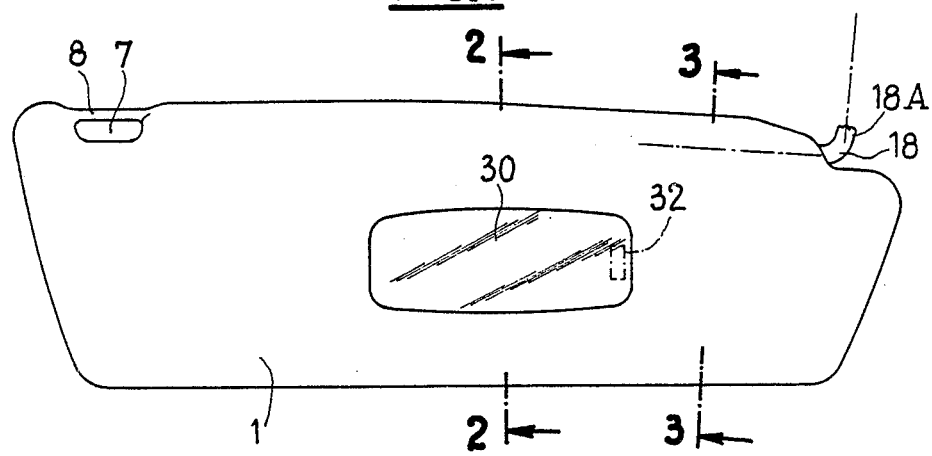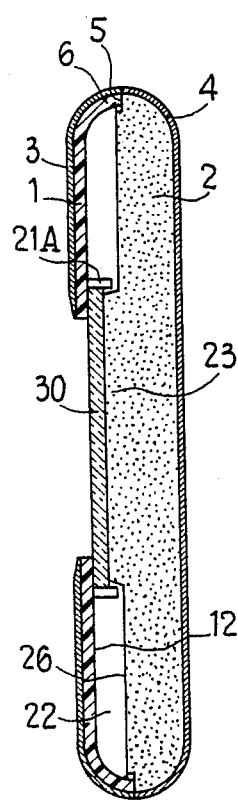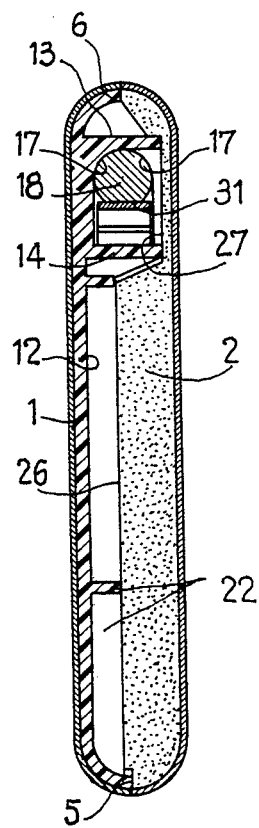

SUN-GLARE SHIELD IN PARTICULAR FOR AN AUTOMOBILE VEHICLE

DESCRIPTION

The present invention relates to a sun-glare shield in particular for an automobile vehicle.

An object of the invention is to provide a sun-glare shield which is particularly advantageous from the point of view of price, weight, stability of the shape and safety for the user.

According to the invention, there is provided a sun-glare shield which mainly comprises a first hollow semi-shell of injected plastics material and a second semi-shell of a foam of plastics material assembled with each other.

In an embodiment which is particularly simple to manufacture on an industrial scale, the first semi-shell carries a support arm bearing which comprises a cage moulded with the first semi-shell and having inner bars which are parallel to outer bars and offset relative to the latter. In this way, there is obtained a first assembly of the semi-shell and cage which can be moulded without a core.

Figure 5:
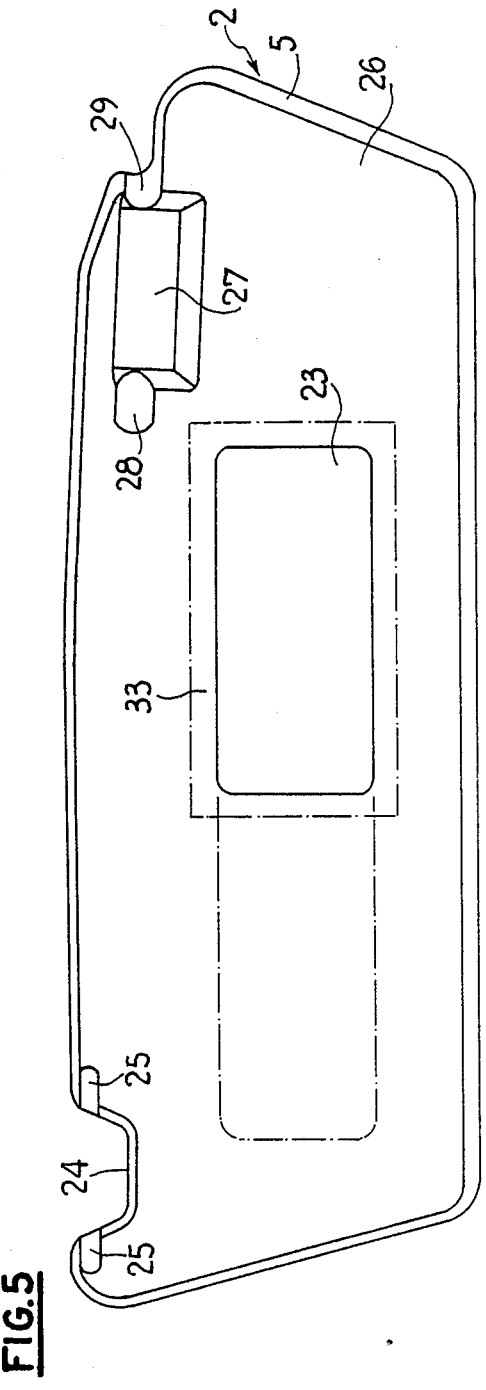

The invention will be described hereinafter in more detail with reference to the accompanying drawings, which show only one embodiment and in which:

FIG. 1 is an outer view of a sun-glare shield according to the invention;

FIGS. 2 and 3 are sectional views, taken on lines 2—2 and 3—3 of FIG. 1, to an enlarged scale;

FIG. 4 is an interior side elevational view of the semi-shell of injected plastics material with a part cut away, and, FIG. 5 is an interior side elevational view of the other semi-shell.

The sun-glare shield shown in the drawings will be assumed hereinafter to be in a vertical active position. It mainly comprises two semi-shells which have a generally planar shape and are assembled. The rear semi-shell 1 is is hollow and made from injected plastics material and the front semi-shell 2 is solid and made from a foam of expanded plastics material. These two semi-shells have mainly the same contour and are held assembled by thermowelding along their joint plane two sheets of plastics material, namely the rear sheet 4 and front sheet 3, which together form the decorative covering of the sun-glare shield.

Each semi-shell 1, 2 has a planar outer surface surrounded by a peripheral rounded marginal portion having a section in the shape of a quarter of a circle. The inner side of the semi-shell 2 is mainly planar and is surrounded by a shallow recess 5 which receives and positions the peripheral edge portion 6 of the semi-shell 1.

The latter has at one end of its upper edge a notch or recess 7 whose entrance is closed by a cylindrical journal 8 which is moulded with the semi-shell and acts as a secondary support for the sun-glare shield. Close to the other end of the same edge, the semi-shell 1 carries a bearing 9 for the support arm 18 and constituted by a cage 10 which is moulded with the semi-shell and a spring strip 11 trapped in this cage.

The cage 10 projects from the planar inner side 12 of the semi-shell 1 and includes an upper wall 13 and a lower wall 14 which are roughly horizontal, parallel to each other and have vertical bars which interconnect these two walls. The outer bars 15 and the inner bars 16 are interposed when viewed in FIG. 4. The bars 15 and 16, or at least some thereof, comprise an arch-shaped portion 17 in a quarter of a circle, so that the cage, when seen from the end (FIG. 3), defines a discontinuous arch in a semi-circle at the diameter of the support arm 18 of the sun-glare shield. Further, the flange 6 forms on the axis of the cage 10 an entrance semi-bearing 19 having a vertical diameter.

The spring 11 is bent and includes end portions bent at 180°. It is axially positioned with clearance between transverse flanges 20 which project from the lower wall 14 of the cage 10 at the ends of the latter.

In the centre region of the semi-shell 1 there is formed a rectangular window 21 which is bordered at each corner by an L-shaped projection 21A. The remainder of the side 12 of this semi-shell is provided with stiffening ribs 22 which are reinforced close to the cage 10 and the notch 8.

The semi-shell 2 has in front of the window 21 a rectangular boss 23 of roughly the same dimensions. A notch 24 similar to the notch 7 is provided in the corresponding position. Adjacent the entrance of this notch 24, two small grooves 25 are provided for receiving the end portions of the journal 8. At the other end of the upper cage of this semi-shell, the inner side 26 of the latter is provided with a recess 27 which receives the cage 10 and in each end of which extends a groove 28-29 forming a semi-bearing for the support arm 18.

A mirror 30 is adhered by substantially the whole of its rear side to the boss 23. When the two semi-shells are assembled, the ribs 22 abut against the side 26. The mirror is positioned by the projections 21A and is pressed against the side 12 on the periphery of the window 21 by the boss 23, while the semi-bearings 19 and 29 together define an entrance bearing for the support arm 18.

In order to assemble the sun-glare shield, it is sufficient to adhere the mirror 30 to the boss 23, introduce the spring 11 in the cage 10, place the two semi-shells in position against each other and place in position the covering 3, 4 by thermowelding it. The spring 11 is pre-positioned by the bars 15, 16 and the flanges 20 and maintained in the compressed state by the support arm 18 which is fitted in the bearing 19-29 and then in the cage 10.

The support arm 18 has at one end a rounded nose portion to facilitate its insertion in the sun-glare shield. Its other end 18A is bent and adapted to be pivotally mounted on the roof of a vehicle.

In passing through the cage 10, the support arm resiliently urges the centre portion of the spring 11 downwardly and this produces the desired resistant torque. The support arm may be provided with at least one flat surface 31 so as to define at least one position of reinforced stability of the sun-glare shield, for example corresponding to its raised inactive position.

The relative rigidity of the semi-shell 1 ensures that the shape of the sun-glare shield remains stable over a period of time. The considerable flexibility of the semi-shell 2, which faces the user when the sun-glare shield is raised, improves safety in the event of impact. The sun-glare shield is very light and each semi-shell is easily moulded without a core, in particular owing to the design of the cage 10.

The fact that the mirror is adhered to the boss 23 permits dispensing with any anti-glass breakage sheet on the rear side of this mirror. By way of a modification, such a sheet may be employed, but the mirror is then not adhered to the boss 23. This would be in particular the case if two of the four projections 21A were replaced by longitudinal slideways 21B. The boss 23 would then be extended and the mirror would be provided with shifting means 32 which project in the window 21 and would thus be slidably mounted in the sun-glare shield for the purpose of sliding the mirror out of view. In this case, the boss 23 would preferably carry in front of the window 21 a piece of covering 33 which matches the covering 3, 4 of the sun-glare shield as defined by front sheet 3 and rear sheet 4. Such a modification is shown in dot-dash lines in FIGS. 1, 4 and 5.

The sun-glare shield may of course be provided with an illuminating device associated with the mirror.

Having now described our invention what we claim as new and desire to secure by Letters Patent is:

1. A sun-glare shield comprising a first hollow semi-shell of injected plastics material and a second semi-shell of a foam of plastics material assembled with each other, said first semi-shell defines a window, which window is internally bordered by framing projecting portions, a mirror is positioned by said projecting portions, at least one boss is provided on an inner side of the second semi-shell and the mirror is maintained applied against an inner side of the first semi-shell by said at least one boss, a decorative covering covers the sun-glare shield, said at least one boss carries a covering which matches the covering of the sun-glare shield and the mirror is provided with shifting means and is slidably guided by said projecting portions for retracting the mirror from said window.

2. A sun-glare shield according to claim 1, wherein the first semi-shell carries a bearing for a support arm, said bearing comprising a cage which is moulded with the first semi-shell, the cage including a plurality of inner bars, a plurality of outer bars, the inner bars being parallel to and offset relative to the outer bars, two end projections, and a spring means positioned between the two end projections.

* * * * *